United States Patent
Spitzer et al.

(10) Patent No.: US 10,261,319 B2
(45) Date of Patent: Apr. 16, 2019

(54) DISPLAY OF BINOCULAR OVERLAPPING IMAGES IN A HEAD MOUNTED DISPLAY

(71) Applicant: GOOGLE INC., Mountain View, CA (US)

(72) Inventors: Mark Bradley Spitzer, Sharon, MA (US); Eliezer Peli, Nedham, MA (US); Benjamin Gallant, Santa Cruz, CA (US)

(73) Assignee: GOOGLE LLC, Mountain View, CA (US)

( * ) Notice: Subject to any disclaimer, the term of this patent is extended or adjusted under 35 U.S.C. 154(b) by 294 days.

(21) Appl. No.: 14/931,381

(22) Filed: Nov. 3, 2015

(65) Prior Publication Data

US 2017/0123209 A1    May 4, 2017

(51) Int. Cl.
*G02B 27/14*    (2006.01)
*G02B 27/10*    (2006.01)
(Continued)

(52) U.S. Cl.
CPC ....... *G02B 27/0172* (2013.01); *G02F 1/1313* (2013.01); *G02F 1/133504* (2013.01);
(Continued)

(58) Field of Classification Search
CPC ............ G02B 27/0172; G02B 27/0101; G02B 27/0149; G02B 27/145; G02B 27/0103;
(Continued)

(56) References Cited

U.S. PATENT DOCUMENTS 5,334,991 A * 8/1994 Wells ............... F16F 15/02
345/7
5,682,173 A * 10/1997 Holakovszky ..... G02B 27/0172
345/8
(Continued)

FOREIGN PATENT DOCUMENTS

| EP | 539907 A2 | 5/1993 |
| WO | 2009015375 A1 | 1/2009 |
| WO | 2016009434 A1 | 1/2016 |

OTHER PUBLICATIONS

International Search Report and Written Opinion for PCT Application No. PCT/US2016/53529, dated Dec. 6, 2016, 16 pages.

*Primary Examiner* — Dawayne Pinkney
(74) *Attorney, Agent, or Firm* — Brake Hughes Bellermann LLP

(57) ABSTRACT

A head mounted display (HMD) device may include a housing coupled to a frame, and a display device disposed in the housing. A first lens may be disposed along a first optical axis in the housing, and a second lens may be disposed along a second optical axis in the housing. A divider may be positioned between the first lens and the second lens, with a front end portion of the divider positioned adjacent to the display device. The divider may include display capability so that images displayed on the display device may extend onto the divider. The divider may emit diffused light having chrominance and/or luminance levels corresponding to images displayed on the display device. The divider may reflect diffused light from images displayed on the display device. The divider may transmit diffused light from images displayed on the display device.

18 Claims, 12 Drawing Sheets

(51) Int. Cl.
*H04N 7/00* (2011.01)
*G09G 5/00* (2006.01)
*G02F 1/1335* (2006.01)
*G02B 27/01* (2006.01)
*G02F 1/13* (2006.01)
*G02B 5/02* (2006.01)

(52) U.S. Cl.
CPC ........ *G02F 1/133553* (2013.01); *G02B 5/021* (2013.01); *G02B 27/0176* (2013.01); *G02B 2027/012* (2013.01); *G02B 2027/0112* (2013.01); *G02B 2027/0118* (2013.01); *G02B 2027/0123* (2013.01); *G02B 2027/0132* (2013.01)

(58) Field of Classification Search
CPC ......... G02B 27/01; G09F 19/18; G03B 21/00; G03B 21/14; G09G 3/003; A61B 3/103; A61B 3/14; A61B 3/113; A61B 3/1225

USPC ...... 359/630–634, 13–14; 349/11; 310/49 R, 310/156.32–156.35, 266–268, 156.02; 353/11–12, 28, 119; 345/7, 9; 351/200, 351/205–206, 210, 221; 340/438, 980, 340/995.1, 815.47, 815.74

See application file for complete search history.

(56) References Cited

U.S. PATENT DOCUMENTS

| | | |
|---|---|---|
| 6,307,589 B1 | 10/2001 | Maguire et al. |
| 8,625,200 B2 | 1/2014 | Smith et al. |
| 2011/0221659 A1 | 9/2011 | King et al. |
| 2014/0104142 A1 | 4/2014 | Bickerstaff et al. |
| 2014/0104143 A1* | 4/2014 | Benson .................... G09G 5/00 345/8 |

* cited by examiner

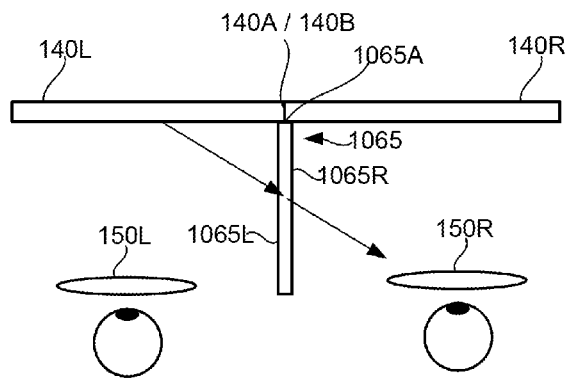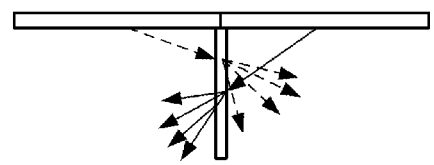
FIG. 10A    FIG. 10B
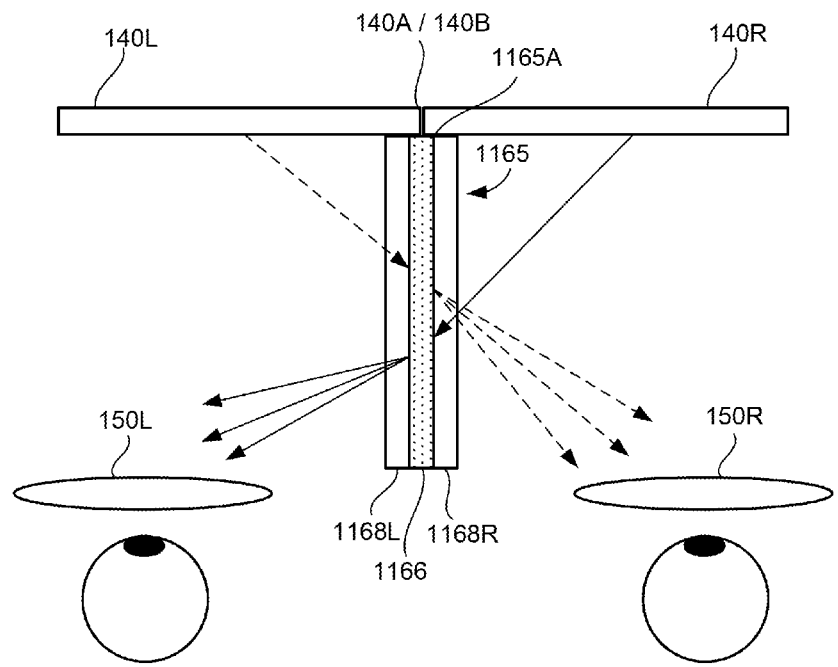
FIG. 11

DISPLAY OF BINOCULAR OVERLAPPING IMAGES IN A HEAD MOUNTED DISPLAY

FIELD

This document relates, generally, to a head mounted display device.

BACKGROUND

A head mounted display (HMD) device is a type of mobile electronic device which may be worn by a user, for example, on a head of the user, to view and interact with visual content displayed on a display of the HMD and sound output by an audio output device of the HMD. An HMD may be operated in connection with a Virtual Reality (VR) system and/or an Augmented Reality (AR) system to generate an immersive environment to be experienced by the user via the HMD.

SUMMARY

In one aspect, a head mounted display device may include a frame, a housing coupled to the frame, a display device disposed in the housing, a first lens mounted in the housing, along a first optical axis, a second lens mounted in the housing, along a second optical axis, and a divider positioned between the first lens and the second lens, the divider having a front end portion positioned adjacent to the display device, the divider being configured to direct light into a viewing area defined by the display device and the divider.

In another aspect, a head mounted display device may include a housing, a display device disposed in the housing, a first lens mounted in the housing, along a first optical axis, a second lens mounted in the housing, along a second optical axis, a divider positioned between the first lens and the second lens, the divider having a front end portion positioned adjacent to the display device, between a first display section of the display device and a second display section of the display device, a first viewing area defined by the first display section of the display device, a first side of the divider, and the first lens, and a second viewing area defined by the second display section of the display device, a second side of the divider, and the second lens.

In another aspect, a method may include displaying images on a display device of a head mounted display device, and emitting light from a divider located adjacent to the display device, the divider meeting the display device at a position where first display section of the display device meets a second section of the display device. Emitting light from the divider may include emitting light from a first side of the divider positioned adjacent to the first display section of the display device, the light emitted by the first side of the divider having a chrominance and a luminance corresponding to a chrominance and a luminance of the images displayed on the first display section, emitting light from a second side of the divider positioned adjacent to the second display section of the display device, the light emitted by the second side of the divider having a chrominance and a luminance corresponding to a chrominance and a luminance of the images displayed on the second display section, and adjusting the chrominance and the luminance of the light emitted by the first side of the divider based on changes in the chrominance and luminance of the images displayed by the first display section, adjusting the chrominance and the luminance of the light emitted by the second side of the divider based on changes in the chrominance and luminance of the images displayed by the second display section The details of one or more implementations are set forth in the accompanying drawings and the description below. Other features will be apparent from the description and drawings, and from the claims.

BRIEF DESCRIPTION OF THE DRAWINGS

FIGS. 10A-10B and 11 illustrate display systems including transmissive type dividers, in accordance with embodiments as broadly described herein.

DETAILED DESCRIPTION

A Virtual Reality (VR) system and/or an Augmented Reality (AR) system may include, for example, a head mounted display (HMD) device or similar device worn by a user, for example, on a head of the user, to generate an immersive virtual world environment to be experienced by the user. The immersive virtual world environment may be viewed and experienced by the user via the HMD, which may include various different optical components that generate images, effects, interactive elements and the like to enhance the user's immersive virtual world experience. A substantially seamless visual experience in which the user's visual field is not obstructed or interrupted or limited by, for example, structural and other components of the HMD, such as, for example, a divider positioned between a left eye display and a right eye display, may enhance the user's immersive virtual experience. That is, in a virtual reality system including an HMD, in accordance with embodiments as broadly described herein, visual continuity may be achieved by providing for continued display of images, and/or corresponding chrominance and luminance levels, displayed on the left eye display onto a corresponding side of such a divider, and/or by providing for continued display of images, and/or corresponding chrominance and luminance levels, displayed on the right eye display onto a corresponding side of such a divider. Accordingly, the divider can be a divider configured to transmit, reflect, and/or emit light.

Figure 1:
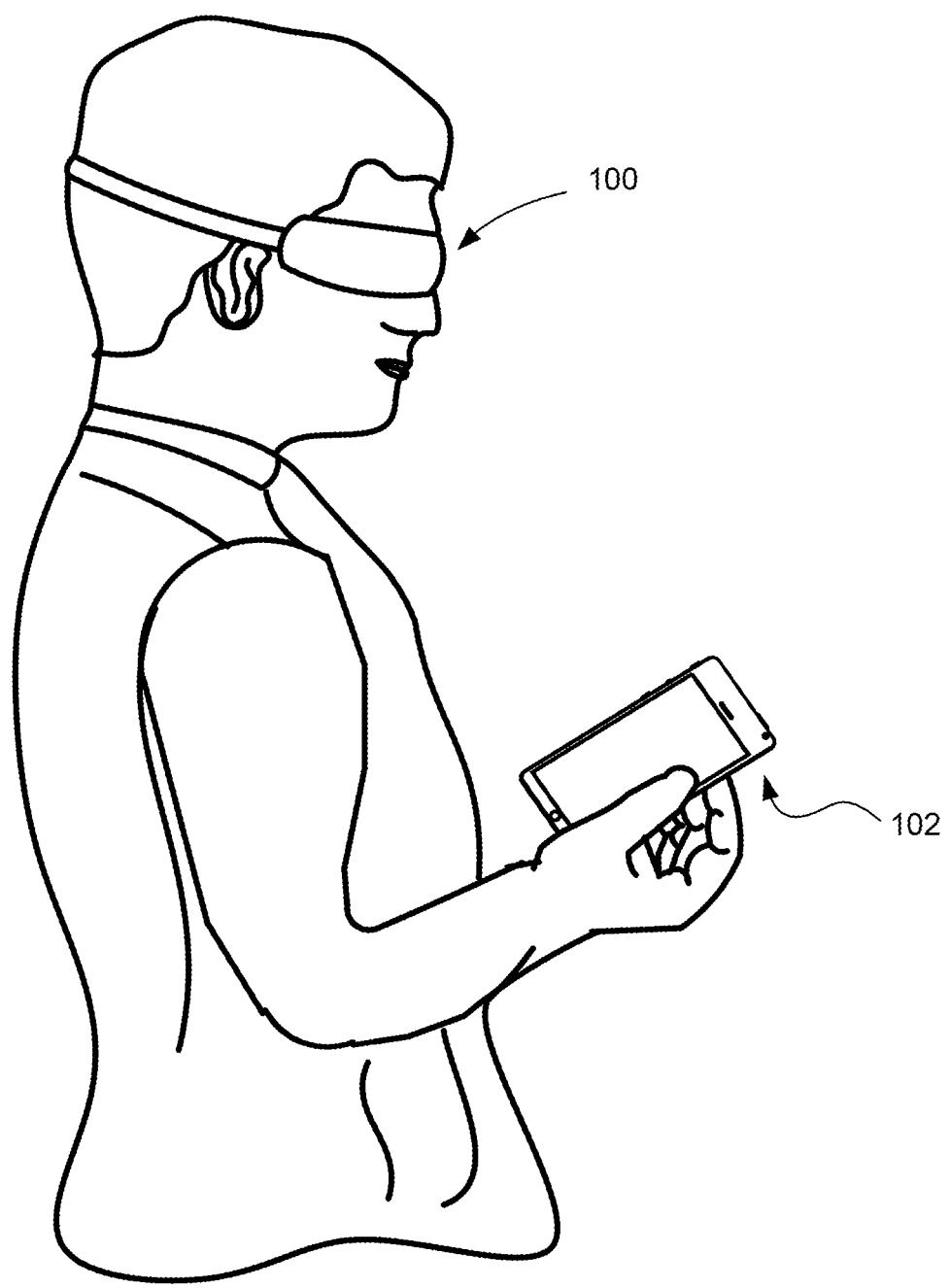
FIG. 1 is an example implementation of a virtual reality system.

In the example implementation shown in FIG. 1, a user wearing an HMD 100 is holding a portable, or handheld, electronic device 102, such as, for example, a smartphone, or other portable handheld electronic device that may be paired with, or operably coupled with, and communicate with, the HMD 100 via, for example, a wired connection, or a wireless connection such as, for example, a wifi or Bluetooth connection. This pairing, or operable coupling, may provide for communication and exchange of data between the handheld electronic device 102 and the HMD 100, so that the handheld electronic device 102 may function as a controller in communication with the HMD 100 for interacting in the immersive virtual world experience generated by the HMD 100. In some embodiments, the virtual reality system may be operated with only the HMD 100, and with user interaction captured and translated by the HMD 100 into interaction in the virtual world.

Figure 2A:
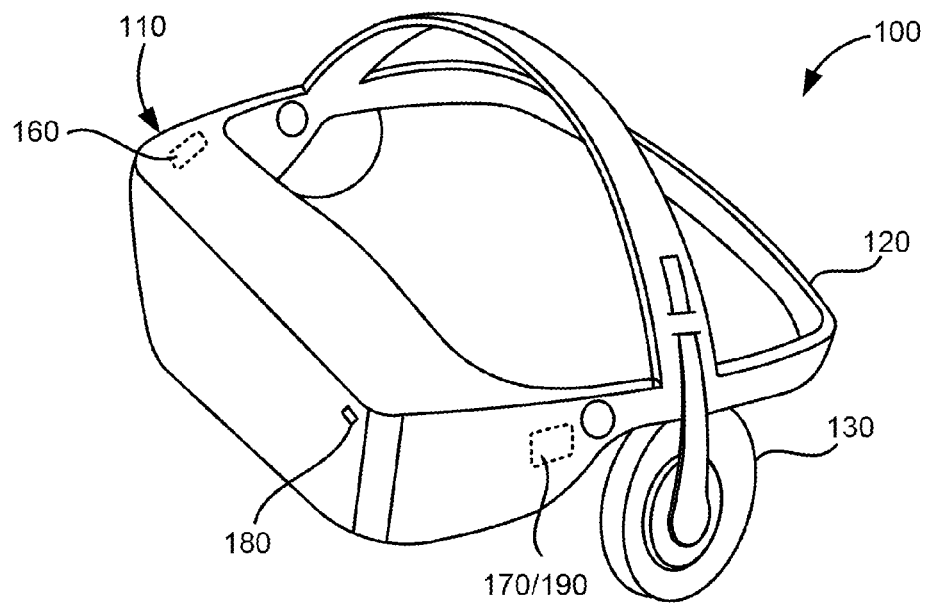
FIGS. 2A and 2B are perspective views of a head mounted display device, in accordance with an embodiment broadly described herein.
Figure 2B:
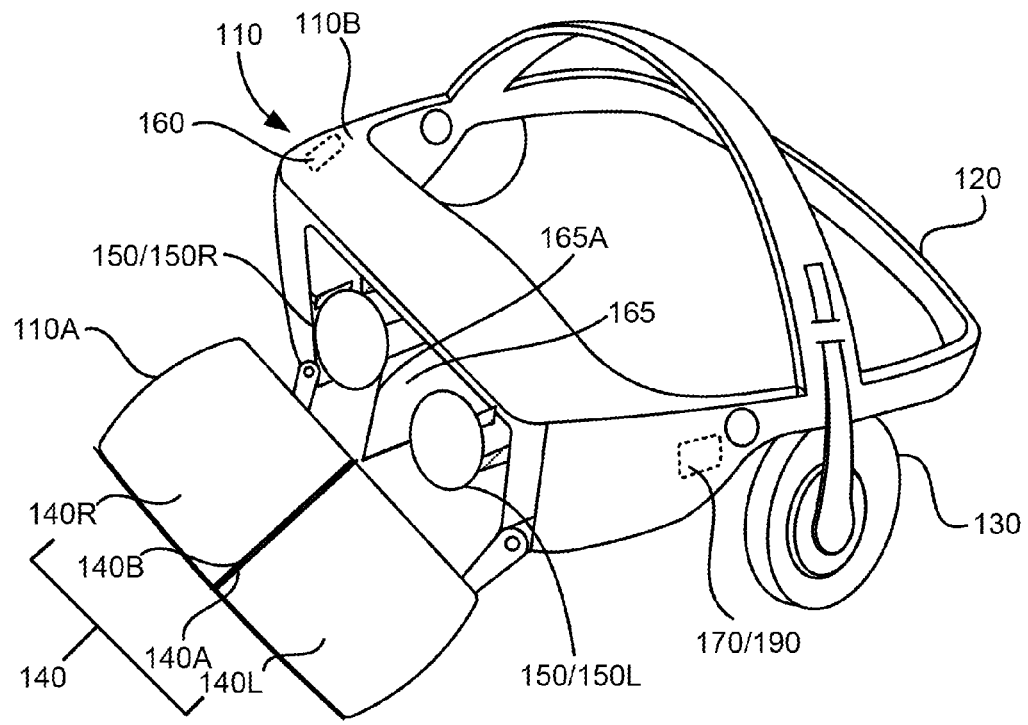

FIGS. 2A and 2B are perspective views of an example HMD, such as, for example, the HMD 100 worn by the user in FIG. 1, to generate an immersive virtual experience. The HMD 100 may include a housing 110 coupled, for example, rotatably coupled and/or removably attachable, to a frame 120. An audio output device 130 including, for example, speakers mounted in headphones, may also be coupled to the frame 120. In some embodiments, the HMD 100 may include a sensing system 160 including various sensors and a control system 170 including a processor 190 and various control system devices to facilitate operation of the HMD 100. In some embodiments, the HMD 100 may include a camera 180 to capture still and moving images of the real world environment outside of the HMD 100.

In FIG. 2B, a front face 110A of the housing 110 is rotated away from a base portion 110B of the housing 110 so that some of the components received in the housing 110 are visible. A display device 140 may be mounted on an inside surface of the front face 110A of the housing 110. As shown in FIG. 2B, in some embodiments, the display device 140 may include a left eye display 140L and a right eye display 140R, arranged adjacent to each other so that the left display 140L is visible by the left eye of the user and the right display 140R is visible by the right eye of the user when the HMD 100 is worn by the user and the front face 110A of the housing 110 is positioned against the base portion 110B of the housing 110.

In some embodiments, the display device 140 may be a single display, separated into a left display section 140L and a right display section 140R. In some embodiments, the display device 140 may be a single, unsegregated display, substantially fully visible by the left eye and the right eye of the user when the HMD 100 is worn by the user.

Lenses 150, and in particular, a left eye lens 150L and a right eye lens 150R, may be mounted in the housing 110, between the user's eyes and the display device 140 when the front face 110A is positioned against the base portion 110B of the housing 110. A position of the lenses 150 may be aligned with respective optical axes of the user's eyes to provide a relatively wide field of view and relatively short focal length. A divider 165 may be positioned between the left lens 150L and the right lens 150R. The divider 165 may extend forward toward the display device 140, so that a front (e.g., distal) edge 165A of the divider 165 is adjacent to the display device 140, and in particular, adjacent to mating edge portions 140A and 140B of the left display/section 140L and the right display/section 140R, respectively. With the front edge of the divider 165 meeting, or joining, or intersecting, or contacting, the display device 140 in this manner, the divider 165 may define a viewing area for the left eye together with the left display 140L, and the divider 165 may define a viewing area for the right eye together with the right display 140R.

The arrangement of elements of the example HMD 100 shown in FIGS. 2A and 2B, and sizing of individual elements, are merely exemplary, and not necessarily to scale, and are illustrated for clarity and ease of discussion.

Figure 3:
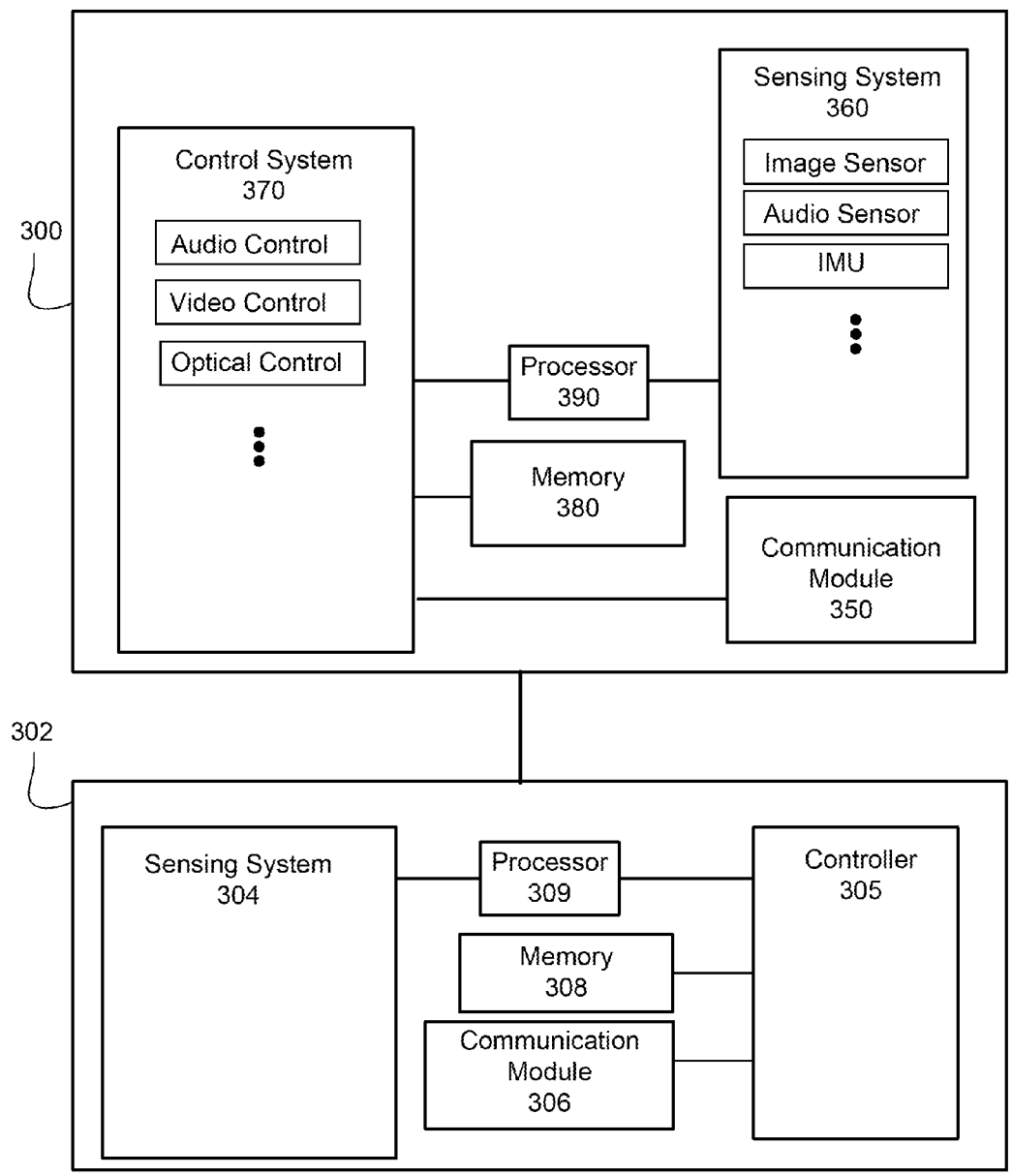
FIG. 3 is a block diagram of a system for displaying binocular-overlapping images in a head mounted display, in accordance with an embodiment broadly described herein.

A block diagram of an example system providing for binocular overlapping images in a head mounted display is shown in FIG. 3. The system may include a first user electronic device 300. In some embodiments, the first user electronic device 300 may be in communication with a second user electronic device 302. The first user electronic device 300 may be, for example an HMD as described above with respect to FIGS. 1, 2A and 2B, generating an immersive virtual world experience, and the second user electronic device 302 may be, for example, a handheld electronic device as described above with respect to FIG. 1, in communication with the first user electronic device 300 to facilitate user interaction with the immersive virtual experience generated by the HMD.

The first electronic device 300 may include a sensing system 360 and a control system 370, which may be similar to the sensing system 160 and the control system 170, respectively, shown in FIGS. 2A and 2B. The sensing system 360 may include numerous different types of sensors, including, for example, a light sensor, an audio sensor, an image sensor, a distance/proximity sensor, an inertial measurement unit (IMU) including for example and accelerometer and gyroscope, and/or other sensors and/or different combination(s) of sensors. In some embodiments, the light sensor, image sensor and audio sensor may be included in one component, such as, for example, a camera, such as the camera 180 of the HMD 100 shown in FIG. 2A. The control system 370 may include numerous different types of devices, including, for example, a power/pause control device, audio and video control devices, an optical control device, a transition control device, and/or other such devices and/or different combination(s) of devices. In some embodiments, the sensing system 360 and/or the control system 370 may include more, or fewer, devices, depending on a particular implementation. The elements included in the sensing system 360 and/or the control system 370 can have a different physical arrangement (e.g., different physical location) within, for example, an HMD other than the HMD 100 shown in FIGS. 2A and 2B.

The first electronic device 300 may also include a processor 390 in communication with the sensing system 360 and the control system 370, a memory 380 accessible by, for example, a module of the control system 370, and a communication module 350 providing for communication between the first electronic device 300 and another, external device, such as, for example, the second electronic device 302 paired to the first electronic device 300.

The second electronic device 302 may include a communication module 306 providing for communication between the second electronic device 302 and another, external device, such as, for example, the first electronic device 300 paired with the second electronic device 302. The second electronic device 302 may include a sensing system 304 including, for example, an image sensor and an audio sensor, such as is included in, for example, a camera and microphone, an inertial measurement unit (IMU), a touch sensor such as is included in a touch sensitive surface of a handheld electronic device, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

Figure 4:
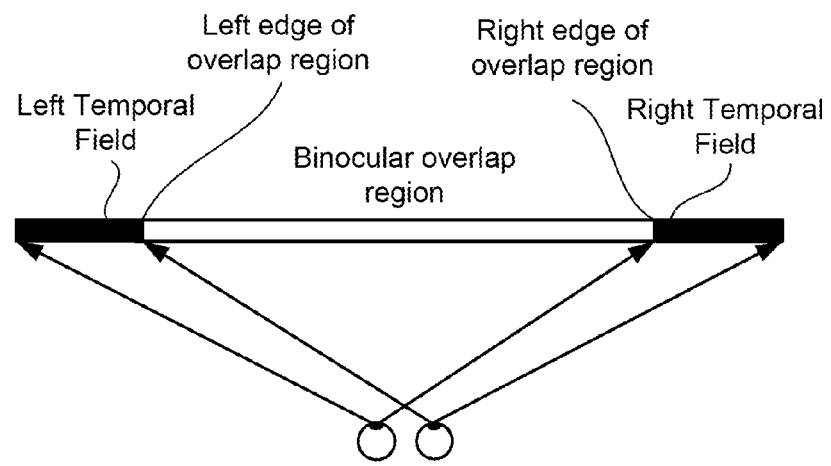
FIG. 4 illustrates a visual field of a user without a display.

As shown in FIG. 4, a typical human visual field may include a left visual field associated with visual perception of light entering the left eye, a right visual field comprising perception of light entering the right eye, and usually includes a left temporal field viewable only by the left eye, and a right temporal field viewable field viewable by the right eye, with a binocular overlap region defined by an overlap of the left visual field and the right visual field. Thus, the visual field may be defined by three regions, including the left temporal field, the binocular overlap region, and the right temporal field. Simply for ease of discussion and illustration, the visual field shown in FIG. 4 is represented as substantially two dimensional planar. However, the human visual field may be arcuate in nature.

Figure 5A:
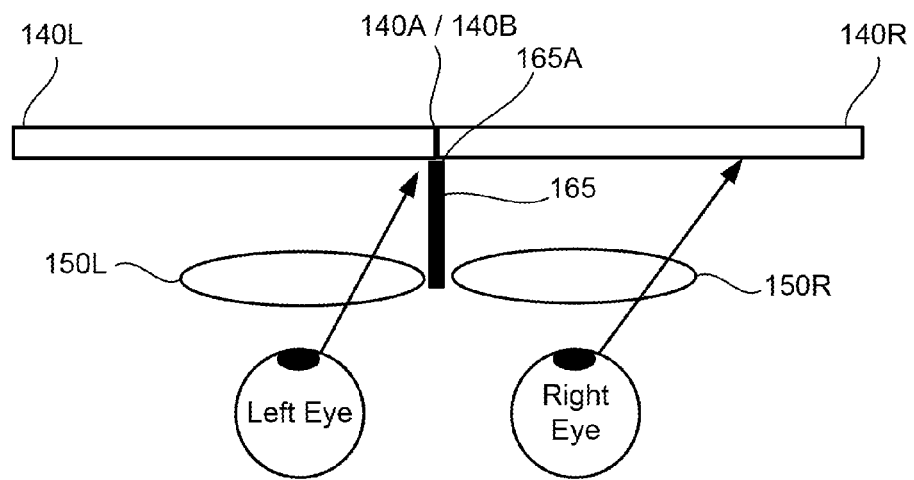
FIGS. 5A-5C illustrate a visual field of a user of a binocular HMD including a divider.
Figure 5B:
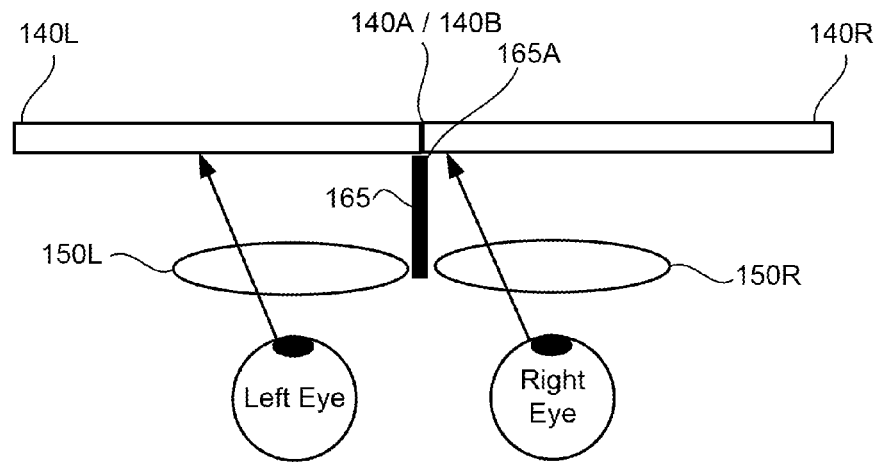

An HMD, such as the example HMD 100 shown in FIGS. 2A and 2B, may use separate displays and optical components, such as the left display/section 140L and left lens 150L for the left eye, and the right display/section 140R and right lens 150R for the right eye, separated by the divider 165, as shown in FIG. 2B. The divider 165 may prevent rays from the left display 140L from reaching the right eye, and rays from the right display 140R from reaching the left eye. As shown in FIG. 5A, as the user's eyes track to the right, the gaze of the left eye is prevented, by the divider 165, from viewing the right display 140R. Similarly, as shown in FIG. 5B, as the user's eyes track to the left, the gaze of the right eye is prevented, by the divider 165, from viewing the left display 140L. If the divider 165 is, for example, an opaque/solid divider, such as a solid black divider, the edges of the overlap region may be apparent to the user, as shown by the shaded areas in FIG. 5C. This artifact, which may be referred to as luning, may pose a distraction to the user, detracting from the immersive virtual experience generated by the HMD 100.

Figure 5C:
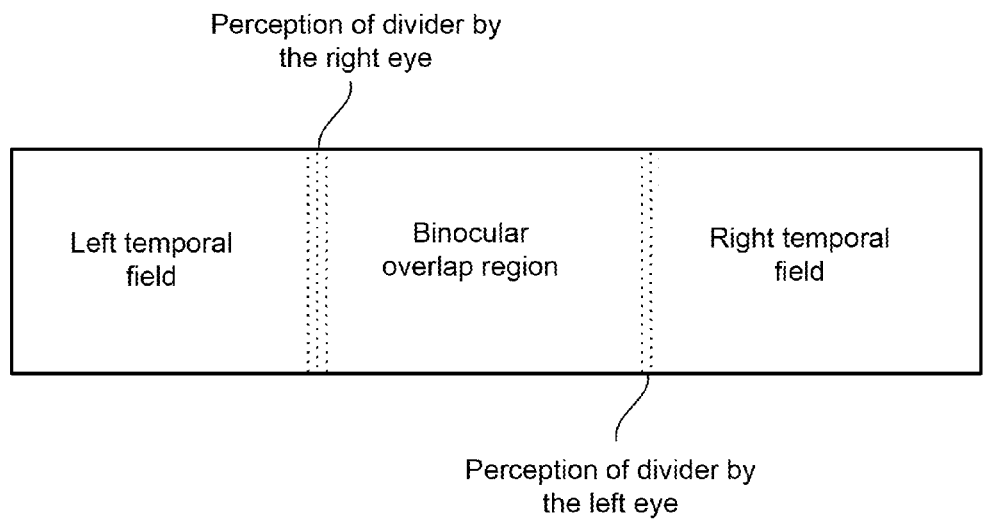

For example, as the left eye sees the divider 165, the right eye sees the display 140R, resulting in a discrepancy between the images provided to the left eye versus the images provided to the right eye from the corresponding direction. As the human brain does not discriminate between the importance of the images of the black divider and the images provided by the display 140R, the brain naturally alternates attention between the two distinct images, resulting in binocular rivalry, with attention diverted to the black divider, as shown in FIG. 5C.

Figure 6A:
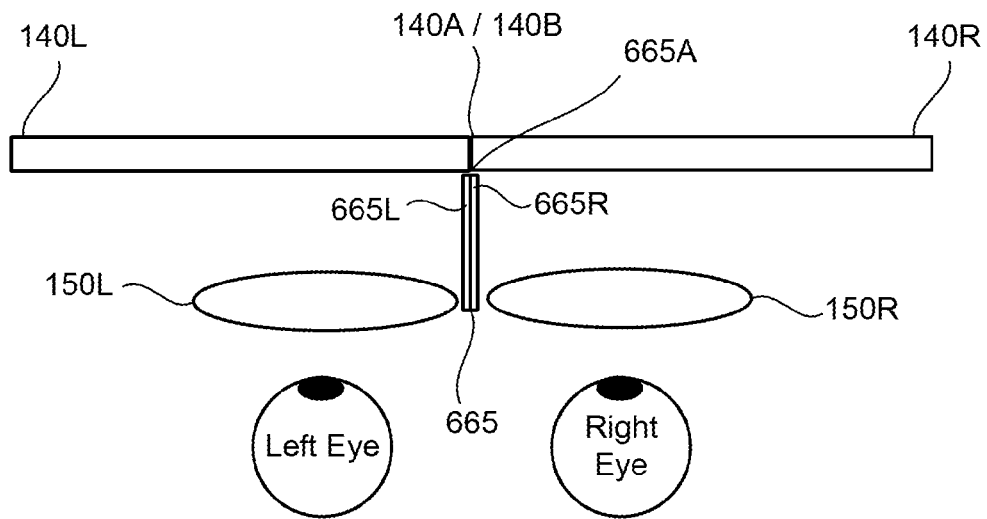
FIGS. 6A-6B illustrate display systems including dividers having display capability, in accordance with embodiments as broadly described herein.

As shown in FIG. 6A, in some embodiments, one or more displays 665 may define a divider between the left and right optical components, and in particular between the left display 140L/left lens 150L and the right display 150R/right lens 150R. The one or more displays 665 may incorporate liquid crystal display (LCD), light emitting diodes (LEDs), organic light emitting diode (OLED) display technology and the like. As human peripheral vision at such eccentric angles is not as acute as typical frontal vision, low resolution displays 665 may have relatively low resolution and still provide for sufficient perceived continuity of the displayed images, in a more computationally efficient manner and with lower power consumption than a higher resolution display such as the displays 140L/140R. An image, generated by the one or more low resolution displays 665, that is more consistent with what the brain expects to see, for example, a continuation of the images displayed on the displays 140L/140R, for the left and right sides of the divider, respectively, may, in this manner, replace the image of the solid black divider discussed above with respect to FIGS. 5A-5C. For example, a left low resolution display 665L may be positioned adjacent to the left display 140L, facing into the viewing area of the left eye, so that a lower resolution version of images displayed on the left display 140L may be continued onto the left low resolution display 665L, and a right low resolution display 665R may be positioned adjacent to the right display 140R, facing into the viewing area of the right eye, so that a lower resolution version of images displayed on the right display 140R may be continued onto the right low resolution display 665R. This arrangement of low resolution displays 665L/665R may provide for visual continuity while also blocking the view of the opposite display and avoiding the distraction of the solid black divider (luning) as discussed above with respect to FIGS. 5A-5C.

Figure 6B:
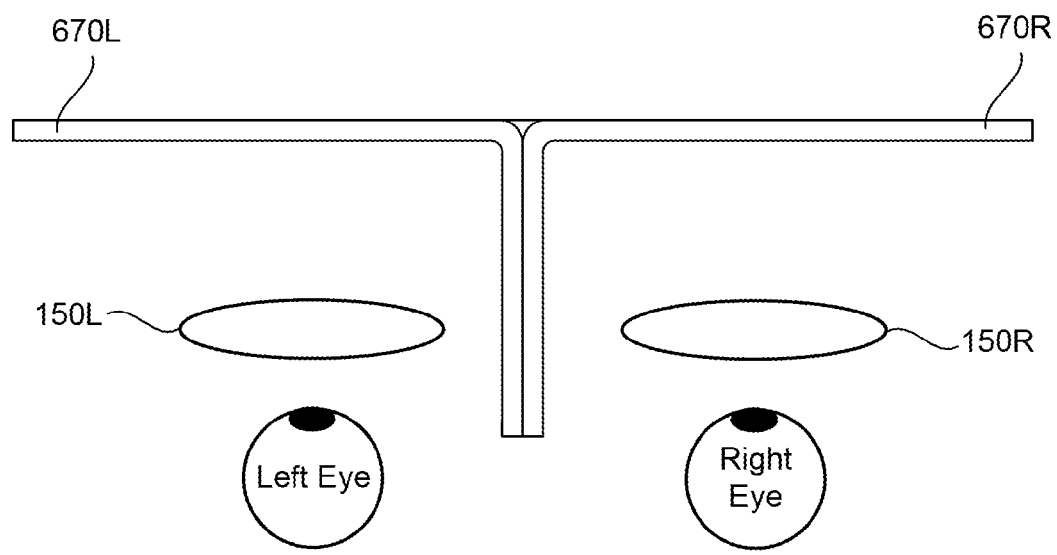

As shown in FIG. 6B, in some embodiments, the left display 140L and left low resolution display 665L may be replaced by a single flexible display 670L, and the right display 140R and right low resolution display 665R may be replaced by a single flexible display 670R. This may reduce or substantially eliminate luning.

Figure 7A:
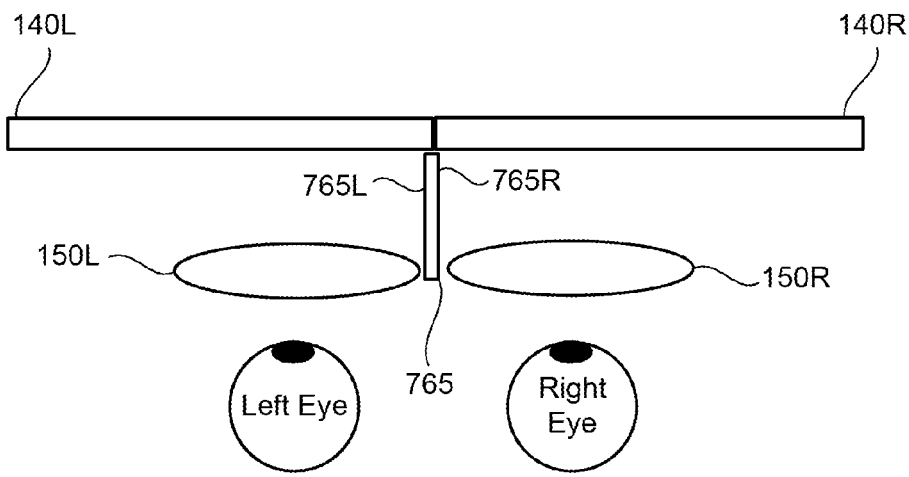
FIGS. 7A-7D illustrate display systems including emissive type dividers, in accordance with embodiments as broadly described herein.

As shown in FIG. 7A, in some embodiments, a bi-facial illuminator 765 (also can be referred to as an emitter) may define a divider between the left and right optical components, and in particular between the left display 140L/left lens 150L and the right display 150R/right lens 150R. The bi-facial illuminator 765 may include a left face 765L facing into the viewing area of the left eye, and a right face 765 facing into the viewing area of the right eye. A luminance and chrominance of the left face 765L of the illuminator 765 may mimic the luminance and chrominance of the images displayed on the left display 140L, and may change as the images displayed on the left display 140L change, providing for visual continuity while also blocking the view of the right display 140R and avoiding the distraction of the solid black divider as discussed above with respect to FIGS. 5A-5C. Similarly, a luminance and chrominance of the right face 765R of the illuminator 765 may mimic the luminance and chrominance of the images displayed on the right display 140R, and may change as the images displayed on the right display 140R change, providing for visual continuity while also blocking the view of the left display 140L and avoiding the distraction of the solid black divider as discussed above with respect to FIGS. 5A-5C. In some embodiments, the left and/or right faces 765L/765R may be patterned or textured so that light emitted through the left and/or right faces 765L/765R may be diffused and uniformly distributed. As human vision at the at the location on the retina where the illuminator 765 is perceived by the viewer is not as clear as typical foveal vision, a mimicking of the luminance and chrominance of the adjacent display on the faces 765L and 765R of the illuminator may provide for sufficient continuity of light striking the retina to reduce or substantially eliminate binocular rivalry without fully, or substantially fully, reproducing or continuing, display of the images from the adjacent display onto the faces 765L and 765R of the illuminator 765.

In some embodiments, the illuminator 765 may include at least three LEDs, for example, red, green and blue LEDs. The color of the last few columns of the right display 140R (for example, the last few columns of the right display 140R closest to the right face 765R of the illuminator 765) may be averaged to determine a mean luminance and an average hue. The right face 765R of the illuminator 765 may then be set to illuminate light that changes in synchronization with these last few columns of the right display 140R so that, in the reduced sensitivity and resolution of the vision at the edge of the right display 140R and at the divider, there will be minimal difference in luminance and chrominance. Illumination of the left face 765L of the illuminator 765 may be based on the last few columns of the left display 140L in a similar manner.

The left and right faces 765L/765R of the illuminator 765 may operate independently, such that luminance and chrominance of the left face 765L of the illuminator 765 is not necessarily the same as the luminance and chrominance of the right face 765R of the illuminator 765, but rather, mimics the luminance and chrominance of the adjacent edge of the corresponding display.

Figure 7B:
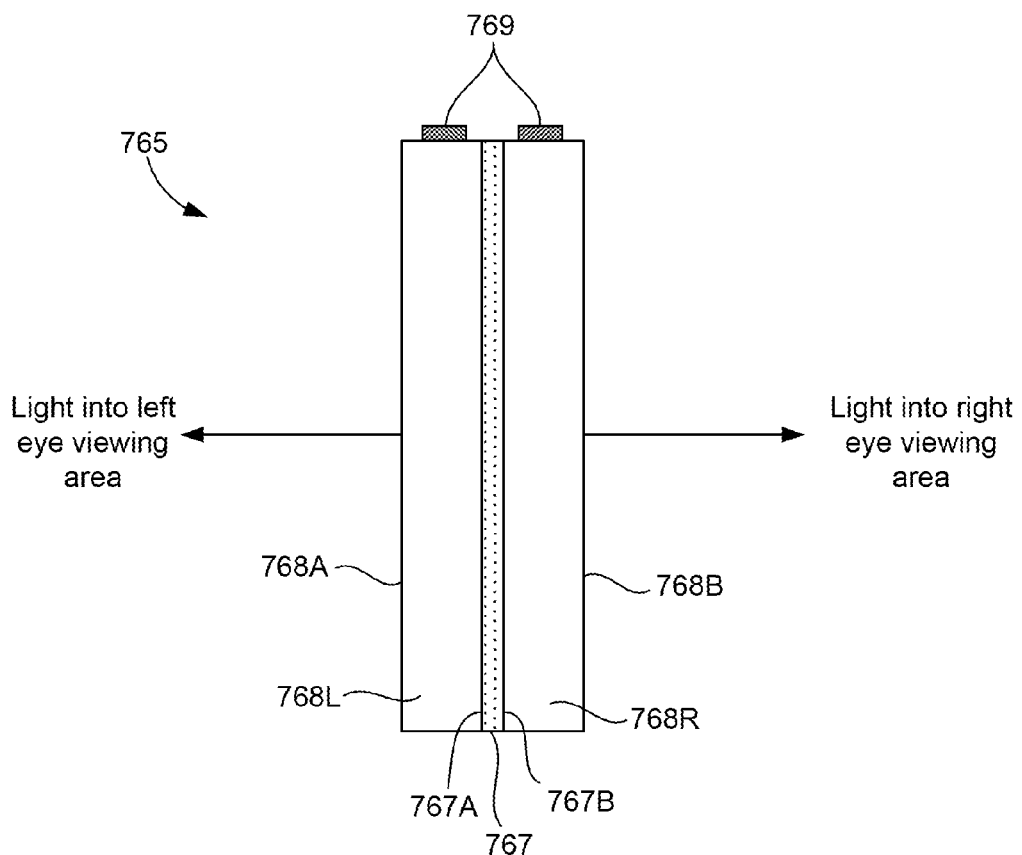
Figure 7C:
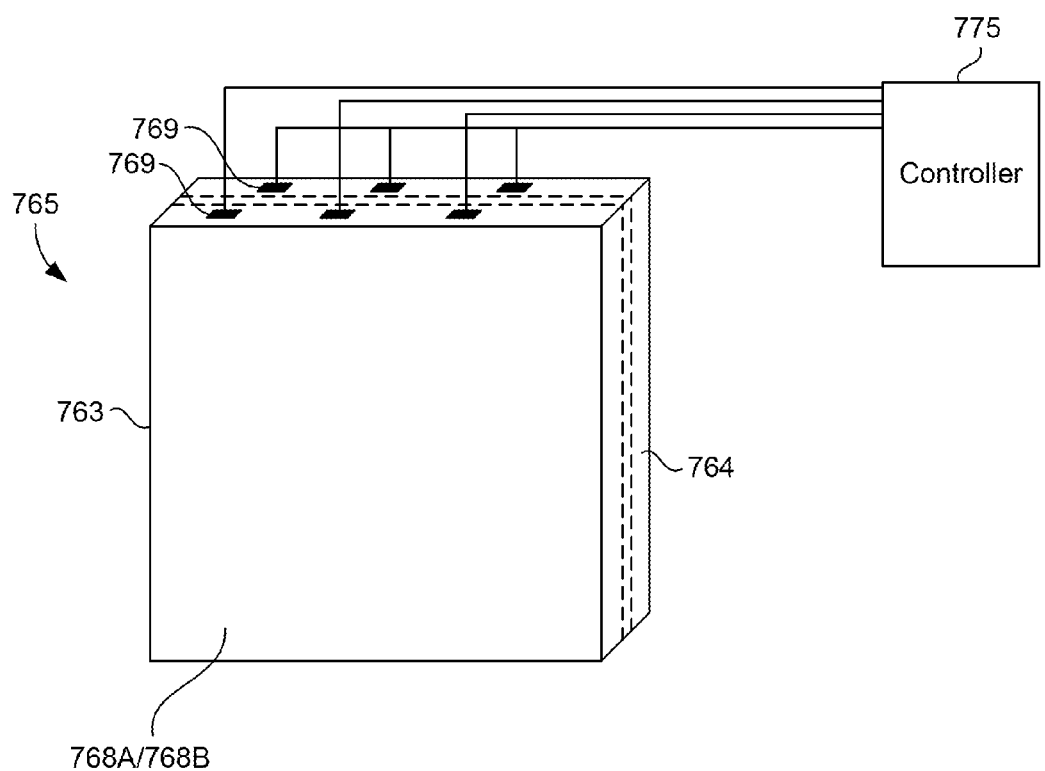

In some embodiments, the bi-facial illuminator 765 may be implemented as a light guide 765C, as shown in FIGS. 7B and 7C. In this example implementation, the light guide 765C may include transparent panels 768L and 768R attached to opposite side surfaces of a reflective interface 767, the light guide 765C having light emitting surfaces 768A and 768B. Light sources 769 may be mounted on one or more surfaces of the light guide 765C to inject light into the light guide 765C, which may then be reflected by the reflective interface 767 out through the emitting surfaces 768A and 768B into the left eye viewing area and the right eye viewing area, respectively. A front end surface 763 of the light guide 765C may be positioned adjacent to the display device 140 as described above. A rear end surface 764 of the light guide 765C may include a reflective material, such as, for example, a reflective coating, so that light injected into (or transmitted into) the light guide 765C by the light sources 769 is reflected out through the emitting surfaces 768A and 768B, and not out through the rear end surface 764.

Although the bifacial illuminator 765/light guide 765C shown in FIGS. 7A-7C have a substantially rectangular shape, a shape of the bifacial illuminator 765/light guide 765C may be contoured to better fit against the nose.

In some embodiments, the light sources 769 may include, for example, light emitting diodes (LEDs), for example, red, green and blue LEDs. The light sources 769 may be controlled by a controller 775, such as, for example, a module of the control system 170 shown in FIGS. 2A and 2B and/or a module of the control system 370 shown in FIG. 3. The controller 775 may select and adjust the color, or chrominance, and/or luminance to be emitted by the light sources 769. Each of the light sources 769 may be individually controlled by the controller 775, or may be collectively controlled for the left panel 768L and collectively controlled for the right panel 768R so that chrominance and luminance reflected through the left panel 768L may be controlled and adjusted independently from chrominance and luminance reflected through the right panel 768R.

In some embodiments, the emitting surface 768 A of the left panel 768L and/or the emitting surface 768B of the right panel 768R may be patterned or textured so that light emitted through the light emitting surfaces 768A and 768B may be diffused and uniformly distributed. In some embodiments, opposite side surfaces of the reflective interface 767 may be patterned or textured, thus blurring the light emitted into the left eye viewing area and the right eye viewing area so that light reflected off the reflective interface 767 and emitted through the light emitting surfaces 768A and 768B may be diffused and uniformly distributed.

Figure 7D:
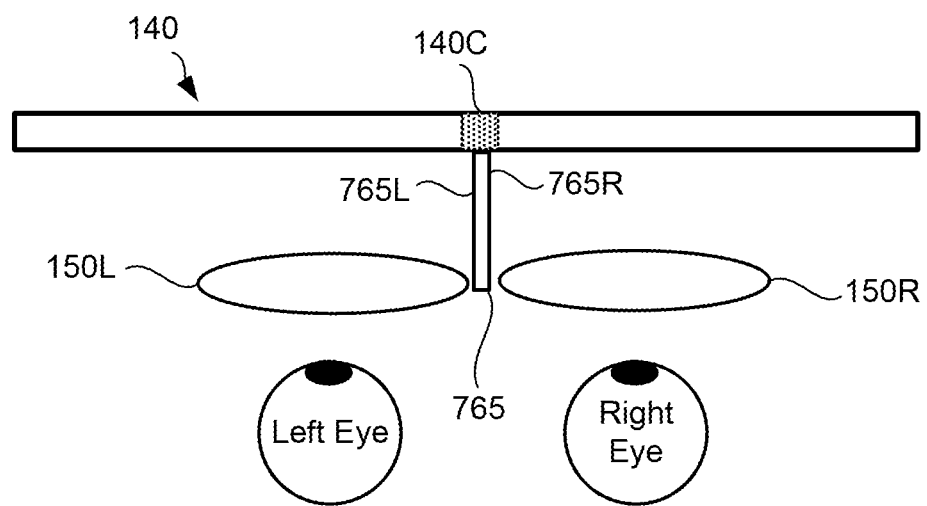

In some embodiments, the display device 140 may be a single display as shown in FIG. 7D, the single display being positioned in the field of view of the user so that portions of the single display are visible to both eyes of the user. A front end 765A of the illuminator 765 may be aligned with, and/or abut, a central portion 140C of the single display. Light emitted by the pixels of this central portion 140C of the single display may be emitted into the illuminator 765 and guided into the left viewing area through the left face 765L, and into the right viewing area through the right face 765R, as described above. A luminance and chrominance of the left face 765L of the illuminator 765, and a luminance and chrominance of the right face 765R of the illuminator, may mimic the luminance and chrominance of the images displayed on the central portion 140C of the single display adjacent to the front end 765A of the illuminator 765, and may change as the images displayed on the single display change, providing for visual continuity and avoiding the distraction of the solid black divider as discussed above with respect to FIGS. 5A-5C.

Figures 8A, 8B:
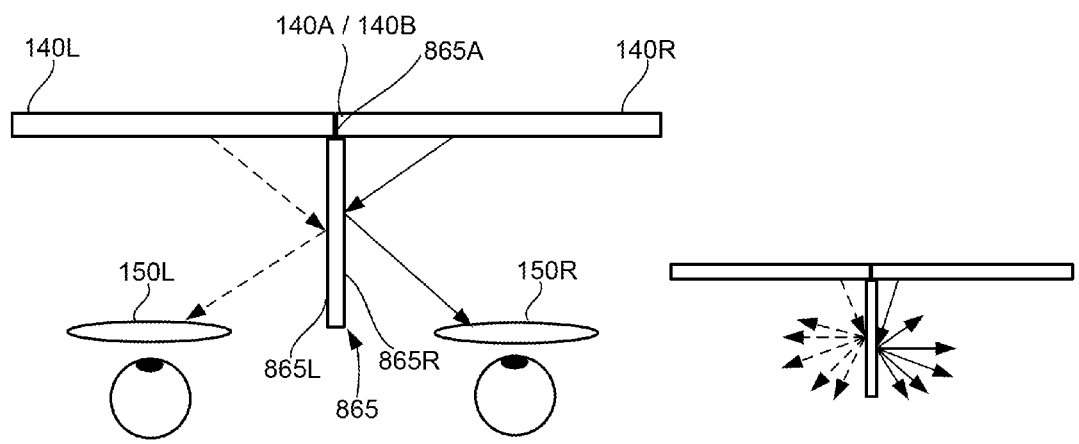
FIGS. 8A-8B and 9 illustrate display systems including reflective type dividers, in accordance with embodiments as broadly described herein.

In the example implementations shown in FIGS. 6A-6B and 7A-7D, an emissive approach is employed in directing light at particular luminance and chrominance levels into the left eye viewing area and the right eye viewing area. In some embodiments, a divider may employ reflective properties of the materials and elements of the divider to reflect ambient light from the display back into the viewing area of the left eye and the viewing area of the right eye as described above. As shown in FIG. 8A, an example divider 865, in accordance with embodiments as broadly described herein, may include a panel having reflecting surfaces 865L and 865R. In some embodiments, the divider 865, for example, the reflecting surfaces 865L and 865R of the divider 865, may be opaque, so that the ambient light from the display does not pass through the divider 865. The reflecting surfaces 865L and 865R may be brushed, or etched, or roughened, or patterned, or in some manner textured, and/or may be coated with a diffuse coating, such as, for example a white or silvered paint or other color coating, so that the surfaces 865L and 865R cause diffuse reflectance as shown in FIG. 8B. In some embodiments, the reflecting surfaces 865L and 865R may be mirror coated and textured to provide this type of diffuse reflection. In some embodiments, the divider 865 itself may be made of a reflective material, such as a reflective metal material (for example, aluminum), having a textured reflective surface (e.g., a brushed surface, an etched surface, a roughened surface).

This reflection of ambient light from the displays 140L and 140R shown in FIGS. 8A and 8B may create the illusion that the reflecting surfaces 865L and 865R are emitting light at luminance and chrominance mimicking the luminance and chrominance levels of the adjacent display, and in particular, luminance and chrominance mimicking the light generated by pixels near the divider 865), thus reducing or substantially eliminating binocular rivalry. In some embodiments, the front end portion of the divider 865 of the divider may overlay corresponding edge portions of the left display 140L and the right display 140R, for example, the rightmost row of pixels of the left display 140L and the leftmost row of pixels of the right display 140R in the example arrangement shown in FIGS. 8A and 8B. Reduction or substantial elimination of a gap between the front end 865A of the divider 865, and in particular, the front end of the reflective surfaces 865L and 865R of the divider and the pixel array of the displays 140L and 140R, noticeable transition from the visual image provided by the display device 140 to the reflected luminance and chrominance provided by the divider 865 may be further reduced (e.g., minimized).

Figure 9:
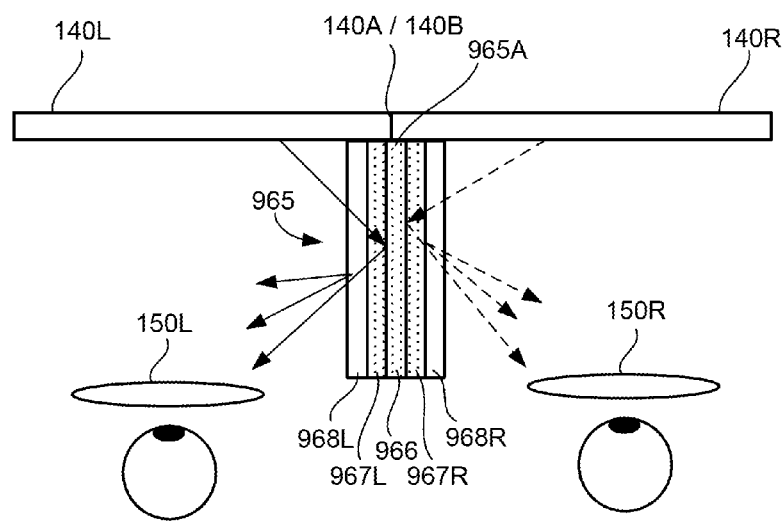

In the example implementation shown in FIG. 9, a divider 965 may include reflective liquid crystal cells 967L and 967R each having a first surface positioned on a respective reflecting surface of a mirror 966, and a second surface positioned adjacent to a respective diffuser panel 968L and 968R. The liquid crystal cells 976L and 967R may be controlled, for example, by a module of the control system 170 shown in FIGS. 2A and 2B, and/or by a module of the control system 370 shown in FIG. 3. In particular, a level of reflectance may be controlled, based on, for example, a level of charge applied to the liquid crystal cells 967L and 967R, to more precisely control a level of luminance generated and directed into the left eye viewing area and the right eye viewing area. In some embodiments, the reflecting surfaces of the mirror 966 and/or surfaces of the diffuser panels 968L and 968R may be brushed, or etched, or roughened, or patterned, or in some manner textured to cause diffuse reflectance as described in detail above with respect to FIGS. 8A-8B. Noticeable transition from the visual image to the luminance and chrominance reflected by the divider 965 may be further minimized by an overlap between the front end 965A of the divider 965 and respective edges the displays 140L and 140R to reduce or substantially eliminate a gap between the divider 965 and the displays 140L and 104R, as described above in detail with respect to FIGS. 8A-8B.

In the example implementations shown in FIGS. 8A-8B and 9, a reflective approach is employed in directing light at particular luminance and chrominance levels into the left eye viewing area and the right eye viewing area. In some embodiments, a divider may employ translucent, or transmissive properties of the materials and elements of the divider to allow light to pass from the right display into the left eye viewing area, and light to pass from the left display into the right eye viewing area. As shown in FIG. 10A, an example divider 1065, in accordance with embodiments as broadly described herein, may include a panel made of, for example, a diffusely transparent material such as, for example, glass or plastic. As the divider 1065 is transparent, or translucent, ambient light from the left display 140L may pass through the divider 1065 into the right eye viewing area. Similarly, ambient light from the right display 140R may pass through the divider and into the left eye viewing area.

Transmitting surfaces 1065L and 1065R of the divider may be textured (e.g., brushed, etched, roughened, patterned), so that the surfaces 1065L and 1065R cause diffuse transmission through the divider 1065 and into the left eye viewing area and the right eye viewing area, as shown in FIG. 10B. This transmission of ambient light from the displays 140L and 140R into the right eye viewing area and the left eye viewing area, respectively, may create the illusion that transmitting surfaces 1065L and 1065R are emitting light at luminance and chrominance levels mimicking the luminance and chrominance levels of the opposite display. The diffuse nature of the transmitted light, due to the patterning or texturing on the transmitting surfaces 1065L and 1065R, may allow for the diffuse transmission of light, but with minimal actual image content. As, in most circumstances, the luminance and chrominance levels of the left display 104L and the luminance and chrominance levels of the right display 140R will be substantially similar, this transmission of light through the divider 1065 may reduce or substantially eliminate binocular rivalry essentially as effectively as the reflective approaches described above.

In the example implementation shown in FIG. 11, a divider 1165 may include transparent diffuser panels 1168L and 1168R on opposite side surfaces of a transparent central panel 1166. The transparent central panel and/or the diffuser panels 1168L and 1168R may be brushed, or etched, or roughened, or patterned, or in some manner textured, to cause diffuse transmission of light, as described above in detail with respect to FIG. 10B, so that diffused light is transmitted through the divider 1165, with minimal image transfer. The addition of separate diffuser panels 1168L and 1168R may provide for additional, and more precise, control of the diffusion of light transmitted through the divider 1165, and further reduction of image content from the opposite display.

In each of the example implementations described above, a level of contrast between the divider and the adjacent display may be decreased, and a visual transition from the adjacent display to the divider may be facilitated, thus rendering the edges of the binocular overlap region much less obvious, and less of a distraction to the user, thus enhancing the immersive virtual experience.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 12:
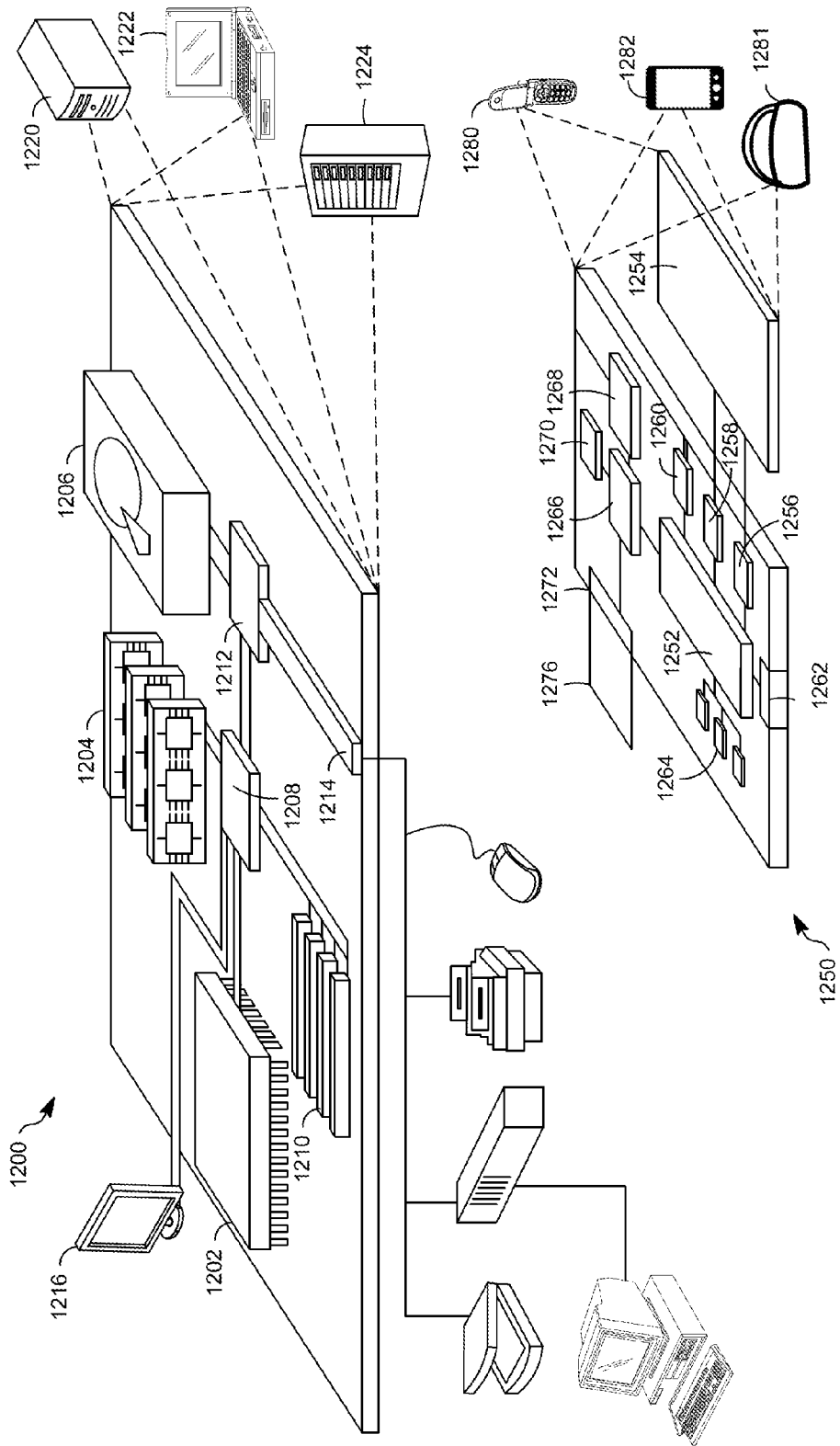
FIG. 12 illustrates an example of a computer device and a mobile computer device that can be used to implement the techniques described herein.

FIG. 12 shows an example of a generic computer device 1200 and a generic mobile computer device 1250, which may be used with the techniques described here. Computing device 1200 is intended to represent various forms of digital computers, such as laptops, desktops, tablets, workstations, personal digital assistants, televisions, servers, blade servers, mainframes, and other appropriate computing devices. Computing device 1250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. The processor 1202 can be a semiconductor-based processor. The memory 1204 can be a semiconductor-based memory. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252, that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smart phone 1282, personal digital assistant, or other similar mobile device, a head mounted display device 1281, or other type of computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A head mounted display (HMD) device, comprising:
a frame;
a housing coupled to the frame;
a display device disposed in the housing, the display device including a first display portion and a second display portion;
a first lens mounted in the housing, along a first optical axis aligned with the first display portion, such that images displayed on the first display portion are visible through the first lens;
a second lens mounted in the housing, along a second optical axis aligned with the second display portion, such that images displayed on the second display portion are visible through the second lens; and
a divider positioned between the first lens and the second lens, including:
　a first side surface having a front end portion positioned adjacent to the first display portion and facing a first viewing area defined by the divider and the first display portion, the first side surface of the divider reflecting light from the first display portion into the first viewing area, the light reflected by the first side surface of the divider providing for visual continuity in the first viewing area together with the images displayed on the first display portion and visible through the first lens; and
　a second side surface having a front end portion positioned adjacent to the second display portion and facing a second viewing area defined by the divider and the second display portion, the second side surface of the divider reflecting light from the second display portion into the second viewing area, the light reflected by the second side surface of the divider providing for visual continuity in the second viewing area together with the images displayed on the second display portion and visible through the second lens.

2. The device of claim 1, wherein the divider is configured to:
transmit light emitted by the first display portion into the second viewing area through the first side surface and second side surface; and
transmit light emitted by the second display portion into the first viewing area through the second side surface and the first side surface.

3. The device of claim 1, the divider also including texturing on the first side surface and texturing on the second side surface, such that light reflected by the divider is diffused by the texturing on the first side surface and the second side surface.

4. The device of claim 1, the divider also including:
a reflective coating on the first side surface of the divider; and
a reflective coating on the second side surface of the divider.

5. The device of claim 4, wherein the divider is configured to:
reflect light emitted by the first display portion off of the reflective coating on the first side surface and into the first viewing area; and
reflect light emitted by the second display portion off of the reflective coating on the second side surface and into the second viewing area.

6. The device of claim 5, the divider also including texturing on the first side surface of the divider and texturing on the second side surface of the divider, such that light reflected by the first side surface is diffused by the texturing on the first side surface, and light reflected by the second side surface is diffused by the texturing on the second side surface.

7. The device of claim 1, the divider including:
a liquid crystal panel;
a first diffuser panel positioned on a first side of the liquid crystal panel, the first diffuser panel including the first side surface of the divider; and
a second diffuser panel positioned on a second side of the liquid crystal panel, the second diffuser panel including the second side surface of the divider,
wherein at least one of the first side surface or the second side surface is textured.

8. The device of claim 1, the divider including:
a mirror panel;
a first liquid crystal panel positioned on a first side of the mirror panel;
a first diffuser panel positioned on a side of the first liquid crystal panel opposite the mirror panel, the first diffuser panel including the first side surface of the divider;
a second liquid crystal panel positioned on a second side of the mirror panel; and
a second diffuser panel positioned on a side of the second liquid crystal panel opposite the mirror panel, the second diffuser panel including the second side surface of the divider.

9. The device of claim 8, wherein the divider is configured to:
reflect light emitted by the first display portion, from the mirror panel through the first liquid crystal panel and the first diffuser panel into the first viewing area; and
reflect light emitted by the second display portion, from the mirror panel through the second liquid crystal panel and the second diffuser panel into the second viewing area,
the first liquid crystal panel adjusting a luminance level of light reflected from the first display portion, and
the second crystal panel adjusting a luminance level of light reflected from the second display portion.

10. The device of claim 1, the divider including:
a reflective panel;
a first transparent panel on a first side of the reflective panel, the first transparent panel including the first side surface of the divider;
a second transparent panel on a second side of the reflective panel, the first transparent panel including the second side surface of the divider; and
a plurality of light sources coupled to the first transparent panel and the second transparent panel and configured to emit light into the first transparent panel and the second transparent panel,
the reflective panel reflecting light emitted by the plurality of light sources into the first transparent panel and the second transparent panel,
the first transparent panel guiding the reflected light into the first viewing area, and the second transparent panel guiding the reflected light into the second viewing area.

11. The device of claim 1, wherein the divider includes:
a first display panel positioned adjacent to the first display portion of the display device, the first display panel including the first side surface of the divider, the first display panel displaying images corresponding to images displayed on the first display portion of the display device; and
a second display panel positioned adjacent to the second display portion of the display device, the second display panel including the second side surface of the divider, the second display panel displaying images corresponding to images displayed by the second display portion of the display device.

12. The device of claim 1, wherein
the first display portion of the display device includes:
a first section aligned with the first optical axis; and
a second section defining the first side of the divider, the first and second sections of the first display portion defining the first viewing area; and
the second display portion of the display device includes:
a first section aligned with the second optical axis; and
a second section defining the second side of the divider, the first and second sections of the second display portion defining the second viewing area.

13. The device of claim 1, wherein
the positioning of the front end portion of the divider abutting the display device and the direction of light from the first side surface of the divider into the first viewing area provides for visual continuity in the first viewing area of images displayed on the first display portion of the display device, and
the positioning of the front end portion of the divider abutting the display device and the direction of light from the second side surface of the divider into the second viewing area provides for visual continuity in the second viewing area of images displayed on the second display portion of the display device.

14. A head mounted display (HMD) device, comprising:
a housing;
a display device disposed in the housing, the display device including a first display section and a second display section;
a first lens mounted in the housing, aligned with the first display section along a first optical axis, such that images displayed on the first display section are visible through the first lens;
a second lens mounted in the housing, aligned with the second display section along a second optical axis, such that images displayed on the second display section are visible through the second lens;
a divider positioned between the first lens and the second lens, the divider having a front end portion positioned adjacent to a peripheral portion of the first display section and a peripheral portion of the second display section;
a first viewing area defined by the first display section of the display device, a first side of the divider, and the first lens; and
a second viewing area defined by the second display section of the display device, a second side of the divider, and the second lens,
wherein the divider includes a reflective device configured to reflect light from the first display section into the first viewing area, and to reflect light from the second display section into the second viewing area, and
wherein the light reflected by the divider into the first viewing area provides for visual continuity of the images displayed on the first display section and visible through the first lens, and
the light reflected by the divider into the second viewing area provides for visual continuity of the images displayed on the second display section and visible through the second lens.

15. The device of claim 14, wherein the divider also includes a transmissive device, the transmissive device including at least one transparent panel, the at least one transparent panel having at least one textured surface, the at least one transparent panel transmitting light emitted by the first display section into the second viewing area through the at least one textured surface, and transmitting light emitted by the second display section into the second viewing area through the at least one textured surface.

16. The device of claim 14, wherein the reflective device includes:
a first reflective surface, the first reflective surface including texturing; and
a second reflective surface, the second reflective surface including texturing,
the first reflective surface reflecting light from the first display section into the first viewing area, and
the second reflective surface reflecting light from the second display section into the second viewing area.

17. The device of claim 14, wherein the reflective device includes:
a reflective panel;
a first light guide panel on a first side of the reflective panel, facing the first viewing area;
a second light guide panel on a second side of the reflective panel, facing the second viewing area;
a plurality of light sources coupled to the divider; and
a controller controlling a chrominance and a luminance of light emitted by the plurality of light sources and directed into the first viewing area by the reflective panel and the first light guide panel, and directed into the second viewing area by the reflective panel and the second light guide panel.

18. The device of claim 14, wherein
the positioning of the front end portion of the divider adjacent to the peripheral portion of the first display section and the direction of light from the divider into the first viewing area provides for visual continuity in the first viewing area of images displayed on the first display section of the display device, and
the positioning of the front end portion of the divider adjacent to the peripheral portion of the second display section and the direction of light from the divider into the second viewing area provides for visual continuity in the second viewing area of images displayed on the second display section of the display device.

* * * * *